D. R. MOLL.
MOTOR CAR LOCK.
APPLICATION FILED AUG. 10, 1917. RENEWED NOV. 10, 1919.
1,335,593.
Patented Mar. 30, 1920.
2 SHEETS—SHEET 1.
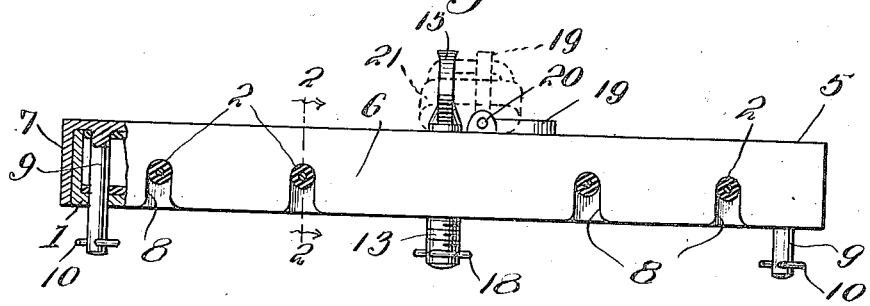
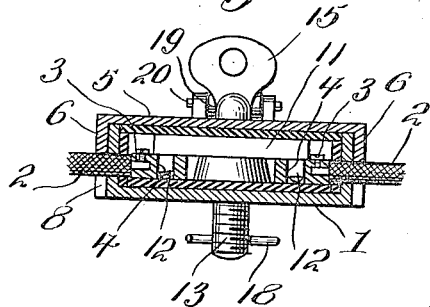 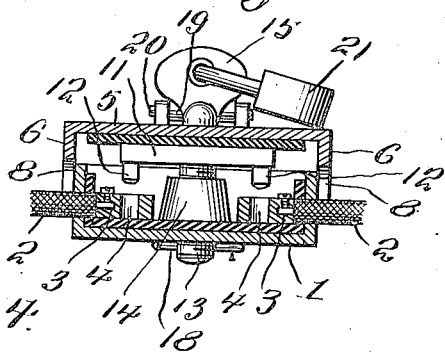
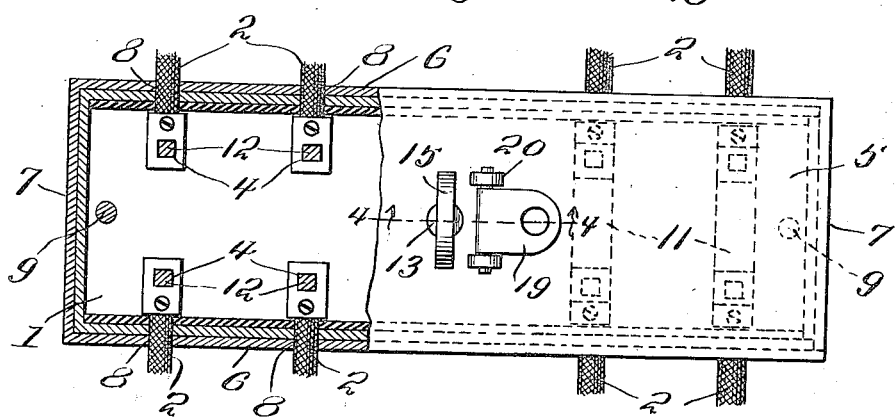
WITNESSES
J. T. L. Wright
J. W. Garner
INVENTOR
Dewey R. Moll
BY Victor J. Evans,
ATTORNEY D. R. MOLL.
MOTOR CAR LOCK.
APPLICATION FILED AUG. 10, 1917. RENEWED NOV. 10, 1919.
1,335,593.
Patented Mar. 30, 1920.
2 SHEETS—SHEET 2.
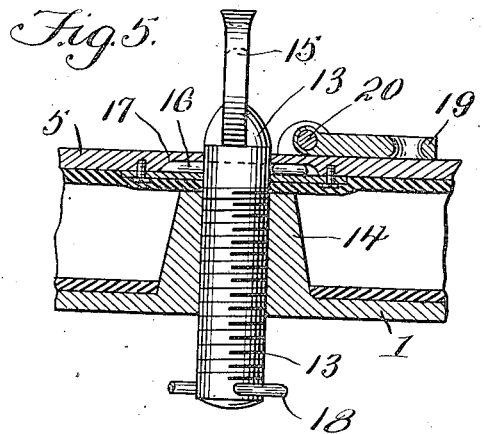
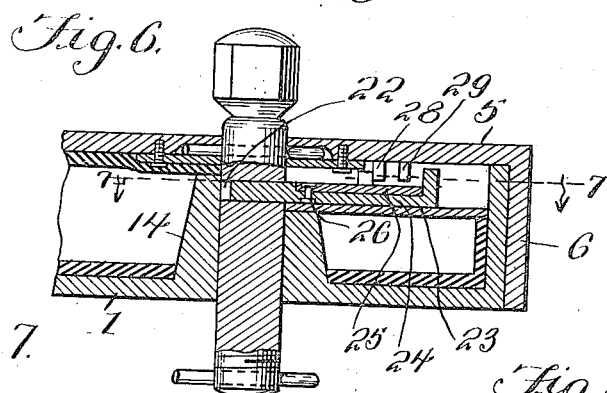
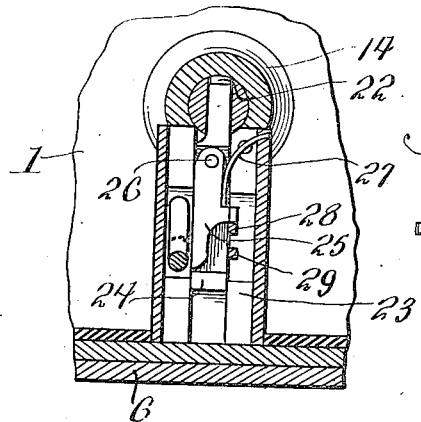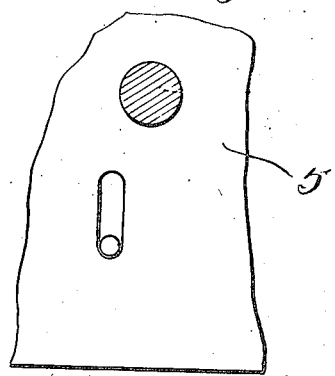
WITNESSES
INVENTOR
Dewey R. Moll
BY Victor J. Evans
ATTORNEY

UNITED STATES PATENT OFFICE.

DEWEY R. MOLL, OF GRAND RAPIDS, MICHIGAN.

MOTOR-CAR LOCK.

1,335,593.  Specification of Letters Patent.  Patented Mar. 30, 1920.

Application filed August 10, 1917, Serial No. 185,563. Renewed November 10, 1919. Serial No. 337,052.

*To all whom it may concern:*

Be it known that I, DEWEY R. MOLL, a citizen of the United States, residing at Grand Rapids, in the county of Kent and State of Michigan, have invented new and useful Improvements in Motor-Car Locks, of which the following is a specification.

This invention relates to motor car protectors or devices to prevent unauthorized persons from starting and operating a motor car or the like, the object of the invention being to provide an improved protector of this kind by means of which the electric circuits of the ignition system may be opened and locked in such open position and thereby prevent the possibility of the motor being started by any one excepting the owner or the authorized operator of the car, and hence protecting the car against theft and against unauthorized use.

The invention consists in the construction, combination and arrangement of devices hereinafter described and claimed.

In the accompanying drawings:—

Figure 1 is a side elevation partly in section of a motor car protector constructed and arranged in accordance with my invention.

Fig. 2 is a transverse sectional view of the same on the plane indicated by the line 2—2 of Fig. 1 and in circuit closing position.

Fig. 3 is a similar view of the same in circuit opening position.

Fig. 4 is a plan of the same partly in section.

Fig. 5 is a detailed sectional view of the same.

Figs. 6, 7, 8 and 9 are detailed views showing a modified form of lock to secure the switch bar operating screw.

In the embodiment of my invention I provide a block 1 to which the conducting wires 2 of the ignition system are connected as at 3, the block being provided with sockets 4 at the terminals of the wires.

On one side of the block is a cover 5 which is movable toward and from the block and is provided with side walls 6 and end walls 7 to engage around the sides and ends of the block. The side walls of the cover are provided with open slots 8 through which the conducting wires 2 extend and thus enable the cover to be moved toward and from the block without affecting the wires. The cover is also provided near its ends with centrally arranged steadying pins 9 which operate in openings in the block and which are provided near their outer ends with suitable stop devices 10, which in practice are preferably cotter pins and which serve to limit the extended movement of the cover from the block. On the inner side of the cover are secured switch bars 11 each of which has down-turned ends 12 adapted to enter the sockets 4 of one of the conductors of the ignition system so that when the cover is moved toward the block a sufficient distance to cause the ends 12 of the switch bars to engage in the sockets 4, the electric circuits of the ignition system are closed, as will be understood, permitting the operation of the motor, and when the cover is moved from the block a sufficient distance to disengage the ends 12 of the switch bars from the sockets, the circuits of the ignition system will be opened and hence it will be impossible to start or operate the motor.

To actuate the cover and thereby actuate the switch bars I provide a screw 13 which engages in a fixed nut 14 in the center of the block, the head of the screw being provided with a ring or eye 15 and being also swivelly connected to the cover for rotation therein and against longitudinal movement independently thereof. To thus swivelly connect the operating screw to the cover the screw is here shown as provided with a cotter pin 16 which operates in an annular groove 17 in the cover. The screw is also provided with a stop pin 18. It will be understood that by turning the screw the cover and the switch bars may be moved as required to open or close the ignition circuits.

To lock the screw and prevent the same from being turned I provide a keeper 19 which is pivotally mounted on the cover, near the screw, as at 20 and which may be folded against the cover, out of the way, or may be turned at right-angles to the cover and parallel with the eye 15 to enable the shackle of a padlock 21 to be passed through the eye 13 and the keeper so that the padlock may be employed for locking the screw and hence preventing the operation of the protecting device.

In Figs. 6, 7, 8 and 9 I show a modification of the invention in which the head of the screw is provided with a transverse opening 22 and a lock 23 is provided, which is secured on the cover and which has a bolt 24, adapted to be operated by a suitable key 50 and engaged with or disengaged from the opening 22 of the screw head. The bolt 24 is provided with a detent 25 which is pivotally connected thereto as at 26. The detent is also operated by the key and is held by a spring 27 against either a catch 28 or a catch 29 according to the position of the bolt, so that the bolt is held against casual movement either in engaged or disengaged position.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In a motor car protector of the class described, a block, a conductor having spaced terminals on the block, a cover movable toward and from the block and having a switch bar to connect and disconnect said terminals, a screw to operate the cover, means to lock the screw and prevent the same from being turned, said cover having side and end walls engaging around the sides and ends of the block, and said walls having slots to clear the conducting wire.

2. In a motor car protector of the class described, a block, a conductor having spaced terminals on the block, a cover movable toward and from the block and having a switch bar to connect and disconnect said terminals, a screw to operate the cover, means to lock the screw and prevent the same from being turned, and the cover being also provided with steady pins which operate in openings in the block, said steady pins and screw being provided with stop devices to limit the movement of the cover from the block.

In testimony whereof I affix my signature.

DEWEY R. MOLL.